United States Patent [19]
Lowe

[11] Patent Number: 5,637,236
[45] Date of Patent: *Jun. 10, 1997

[54] METHOD FOR PRODUCING A WALL, ROADWAY, SIDEWALK OR FLOOR OF CEMENTITIOUS MATERIAL

[76] Inventor: Michael Lowe, 2634 Firestone Dr., Clearwater, Fla. 34621

[*] Notice: The term of this patent shall not extend beyond the expiration date of Pat. No. 5,372,676.

[21] Appl. No.: 298,188

[22] Filed: Sep. 1, 1994

Related U.S. Application Data

[63] Continuation-in-part of Ser. No. 231,028, Apr. 22, 1994, Pat. No. 5,372,676, which is a continuation-in-part of Ser. No. 84,081, Jun. 28, 1993, abandoned, which is a continuation of Ser. No. 700,623, May 15, 1991, abandoned.

[51] Int. Cl.$^6$ ............... B28B 1/08; B28B 7/36; B28B 11/00; B44C 1/22
[52] U.S. Cl. ............... 216/39; 216/30; 216/96; 216/99; 264/71; 264/74; 264/133; 264/162; 264/163; 264/232; 264/233; 264/245; 264/313; 264/338; 264/340; 427/393.6; 428/15; 428/703
[58] Field of Search ............... 264/69–72, 333, 264/131, 133, 139, 162, 163, DIG. 43, 73, 74, 233, 313; 156/61, 655, 654, 645, 657.1, 659.11, 655.1, 654.1, 645.1; 428/15, 49, 904.4, 688, 703; 106/715; 52/311, 314, 316; 427/393.6; 204/338, 232, 340, 245; 216/30, 39, 99, 96

[56] References Cited

U.S. PATENT DOCUMENTS

| | | |
|---|---|---|
| 4,769,191 | 9/1988 | Diana . |
| 5,167,991 | 12/1992 | Lowe . |
| 5,225,134 | 7/1993 | Nasuik et al. . |
| 5,232,646 | 8/1993 | Nasuik et al. . |
| 5,372,676 | 12/1994 | Lowe ............... 264/74 X |

*Primary Examiner*—Karen Aftergut
*Attorney, Agent, or Firm*—A. W. Fisher, III

[57] ABSTRACT

A method for producing a wall, roadway, sidewalk or floor of cementitious material having the appearance of natural stone and mortar including a base with an outer surface with a plurality of irregular shaped protrusions disposed in a random pattern to simulate natural stones and a plurality of simulated grout lines formed therebetween, the method including the steps of preparing a cementitious material, pouring the cementitious material into a form, vibrating the cementitious material, allowing the cementitious material to cure forming the base with the outer surface, releasing the base with the plurality of irregular shaped protrusions disposed in the random pattern to simulate natural stones and the plurality of simulated grout lines formed therebetween from the form, coloring the outer surface and accenting the plurality of simulated grout lines.

16 Claims, 5 Drawing Sheets

METHOD FOR PRODUCING A WALL, ROADWAY, SIDEWALK OR FLOOR OF CEMENTITIOUS MATERIAL

This application is a continuation-in-part application of allowed application Ser. No. 08/231,028, filed Apr. 22, 1994, now U.S. Pat. No. 5,372,676, which is a continuation-in-part application of Ser. No. 08/084,081, filed Jun. 28, 1993, now abandoned, which is a continuation application of Ser. No. 700,623, filed May 15, 1991, now abandoned.

BACKGROUND OF THE INVENTION

1. Field of the Invention

A method for producing a wall, roadway, sidewalk or floor of cementitious material having the appearance of natural stone and mortar.

2. Description of the Prior Art

The high cost of labor and material have made the use of genuine brick, stone, rock and tile in construction prohibitively expensive.

As a result relatively inexpensive polymers and concrete have become popular in the manufacture of artificial brick, stone, rock and tile. Artificial brick surfaces are relatively easy to produce. However the production of aesthetically appealing artificial stone is more difficult. Specifically, replicating the texture resembling real stone and the color is often poor.

U.S. Pat. No. 4,310,370 shows a process for producing decorative articles comprising the steps of placing into mutual contact and laminating a hardenable decorative material layer and an expansion-contraction deformable sheet provided with regions susceptible to expansion-contraction deformation and regions not susceptible to deformation; causing the deformable sheet to undergo deformation under pressure to impart a pattern of unevennesses to the decorative material layer in contact with the sheet; and causing the hardenable decorative material layer to fully harden. The sheet deformed under pressure imparts a pattern of surface unevenness corresponding to the two kinds of regions to the decorative material layer. The degree of surface unevenness can be controlled by adjusting the pressure. Colored patterns corresponding to the unevennesses can also be formed.

U.S. Pat. No. 3,836,619 describes a method of forming an artificial stone comprising the steps of providing a flexible mold; pouring a curable mixture of polyester plastic and catalyst in the mold to form a polyester plastic body having a configured surface; scraping off excess of the curable mixture by applying sufficient pressure to depress the edges of the mold and form a raised lip on the plastic body; curing the mixture; removing the plastic body from the mold; spraying the configured surface with a liquid color layer and drying; spraying the color layer with a curable, transparent, liquid coat and curing said coat until the outer surface is gelled; spraying a thin layer of sand on the outer surface of said transparent coat, and curing the transparent coat, thereby bonding the sand layer to the transparent coat layer.

U.S. Pat. No. 4,349,588 teaches a method for producing simulated brick, tile wall or floor using cement, water-based adhesive and water insoluble powdered pigment. The mixture is applied and then partially set. Scoring indentations are made to remove cement. After being completely set, mortar is placed in the indentations as a grout and allowed to set. The final step is a clear water-resistant coating on the entire surface.

U.S. Pat. No. 4,126,727 shows a resinous polymer sheet material having selective, decorative effects comprising a first layer of a resinous polymer composition; a pattern or design printed on and adhered to the surface of the first layer of resinous polymer composition and having relatively dark colored printed portions and relatively light colored printed portions. A second layer of a resinous polymer composition is applied on and adhered to the printed pattern or design and to the first layer of resinous polymer composition. The second layer of resinous polymer composition includes a layer of relatively small, flat, decorative chips or flakes comprising a very thin layer of translucent or transparent platelets provided with coating. Light wave interference and color absorptive effects are created as light waves strike and reflect from the second layer of resinous polymer composition whereby the decorative chips or flakes located over the relatively dark colored printed portions are discernible from eye-level or a distance of about five feet whereas those decorative chips or flakes located over the relatively light colored printed portions are indiscernible from eye-level or a distance of about five feet.

U.S. Pat. No. 4,105,816 describes a decorative relief finished surface formed to a substrate by applying an undercoat material to a predetermined thickness and forming an uneven pattern with a rolling device having a plurality of convex parts of curved continued, disconnected or perforated line shape which are formed in a random manner, with the intervals between the convex parts being substantially equal to each other, or by spraying coating material with a spray gun so as to form a multiplicity of projections of varying height. Then, the top portions of the projections of the partially hardened surface which extend beyond a predetermined height are pressed with a pressing roll such that the projections are uniformly flattened to a predetermined thickness while the rest of the convex parts are left unflattened.

U.S. Pat. No. 3,882,218 shows embossed decorative patterns and decorative laminates, particularly textured film finished structural elements and the method of manufacture wherein a resilient material such as a wadding sheet or pad sheet is interposed between the surface film and the substrate.

U.S. Pat. No. 3,152,002 describes a process of making elastomeric flooring of varigated color comprising the steps of coating a sheet of backing material with a liquid polyvinyl chloride plastisol, delivering a charge of solid unheated plastic granules of polyvinyl chloride compound and different colors to the coated backing sheet, spreading the granules in a layer of substantially uniform thickness in the liquid plastisol, partially curing the plastisol to fix the position of the granules on the backing sheet and then molding the components into a product of the desired surface texture.

U.S. Pat. No. 3,012,285 teaches a process of producing an elastomeric covering for floors, walls and the like comprising the steps of mixing a plurality of moldable vinyl elastomers of different shades of the same base color, calendering the mixture to form a solid mottled sheet of the selected colors, heating the calendered elastomeric sheet to molding temperature, molding the overall surface area of the sheet by applying a mold having a plurality of scattered low protuberances of irregular outline and of varying size, depth, configuration and distribution, removing the mold from the molded sheet, coating the molded surface of the elastomeric sheet with a paint of a color contrasting with the base color and then removing the colored paint immediately to expose plane surface areas of the molded elastomeric sheet while leaving the depressed areas of the cavities thereof permanently coated with the contrasting colored paint.

U.S. Pat. No. 2,577,241 shows a method of producing a face configuration of variable pattern which comprises impressing in the face of deformable material a textured surface element having a definite face pattern to thereby provide the deformable material with a face presenting a complete pattern complemental to the pattern of the element and then impressing on the deformable material face to a less depth a textured surface element in random relation to the complemental pattern to randomly modify the pattern of said material face while maintaining the general texture resulting from the first impression.

Moreover, walls have been constructed from individual stones, rocks, blocks or bricks assembled into a wall with mortar or the like. Such walls are expensive and time consuming to construct.

As a far less expensive alternative, walls may be constructed of hardenable construction material such as concrete. The outer face of such a wall may be smooth or textured having the appearance of a wall formed from a plurality of individual assembled units such as bricks or rocks.

U.S. Pat. No. 3,307,822 illustrates construction of a vertical wall from concrete to create the appearance of a wall of individual bricks. The technique of creating a vertical concrete wall with a contoured surface comprises pouring the wall between mold members having a contour on one or more of the lateral faces of the wall once the concrete hardens.

U.S. Pat. No. 5,232,646 describes a contoured wall and method for creating the contour and appearance of a wall formed from individual assembled units such as stones. The wall is formed form a plurality of interlocking wall portions that each have at least two non-linear mating surfaces. Each of the wall portions further has a lateral face contoured to resemble the stone wall. The wall is formed from hardenable construction material such as concrete poured between two mold members. Each of the mold members has a lateral mold face with at least one of the lateral faces having a plurality of interlocking contoured relief portions to provide a molded surface having the contour of a stone wall.

U.S. Pat. No. 5,225,134 shows a contoured wall and method for creating the contour and appearance of a wall formed from individual assembled units such as stones. The wall is formed from a plurality of mating form liners each having a reciprocal contoured surface to that of the desired stone wall. The wall is formed from hardenable construction material such as concrete poured between two mold members with the form liners attached to at least one of the mold members. Each of the form liners has a lateral relief mold face adapted to provide a molded surface having the contour of a stone wall. Each lateral relief mold face of the form liners has a lattice work non-linear mortar-forming interlocking portion surrounding stone-forming recessed portions. The form liners are positionable in a plurality of arrangements wherein the interlocking portions and recessed portions along the mating edge of each form liner mate along the mating edge of the adjacent form liner to form a continuous lateral relief mold face.

U.S. Pat. No. 4,769,191 teaches a reinforced concrete wall such as a road barrier or barricade having a monolithic surface ornamentation constituted by pigmented cements and grooves simulating mortar joints. In the horizontally oriented top portions of the wall where the pigmented cements are substantially thicker than the layers of pigmented cements monolithically jointed to the vertical oriented portions of the wall so that these portions, which are subject to chipping and the like during handling and use will retain their aesthetically pleasing appearance. In the molding process, ribs on the mold surface which will form the grooves have a retardant applied thereto so that the cement forming the mortar joint will set at a slower rate than the rest of the body of the concrete wall and when removed from the mold can be brushed. When the wall is in the form of a road barrier, the ends are provided with a conical projection and a conical recess, respectively, to provide coupling between adjacent wall units.

U.S. Pat. No. 5,167,991 describes a method for producing a replicated stone surface comprising the steps of preparing a polymer mortar, coating a substrate with the polymer mortar, leveling the polymer mortar to a substantially even thickness, creating a textured surface on the polymer mortar, applying a hydrophobic release agent to the surface of polymer mortar, displacing portions of the polymer mortar by pressing a patterned tool on the surface of the polymer mortar to form the plurality of simulated stones with raised peripheral edges and intervening simulated grout lines, allowing the polymer mortar to cure, applying a pigment to the surface of the plurality of simulated stones and simulated intervening grout lines, buffing the surface of the plurality of simulated stones and simulated intervening grout lines to impregnate the pores, thereof with the pigment, abrading the surface of the plurality of simulated stones to create a weathered appearance and sealing the surface of the plurality of simulated stones and simulated intervening grout lines with a sealer to protect the replicated stone surface.

U.S. Pat. No. 4,043,826 shows a light-weight simulated rock made by molding a composition comprising cement, a light-weight filler, water, a curing agent for the cement and an acrylic resin latex in a flexible mold and thereafter nonuniformly coloring the hardened rock body so formed with cement dyes and/or pigments.

U.S. Pat. No. 3,621,086 teaches a process for making concrete brick which has a sufficiently smooth and attractively colored surface to be used as a facing or outside surface building unit. Colors are applied as fluid color mixes to a plurality of the vertical faces of the mold chambers in a block making machine prior to adding concrete mix thereto. Rapidly thereafter, concrete mix is added and the mold is vibrated to compact the mix and concurrently distribute over the surface of the material in the mold portions of the color mix to achieve a desired color effect. The color mix applied to the mold surface may be changed according to a predetermined pattern on each batch of such bricks.

U.S. Pat. No. 3,939,238 describes a process for coating concrete bricks with exposed surfaces having sharply delineated portions of contrasting color and/or texture by periodically and regularly forming atomized particles of a viscous cementitious slurry and directing same on to portions or surfaces of each of a plurality of green concrete bricks in groups located stationary in regular fashion for a brief period and thereafter firing the thus coated uncured brick. The processes include steps for rapidly and/or sequentially varying the colors applied to the different groups of bricks during successive cycles of coating the successively treated different groups of such bricks.

DE 3601041 shows an artificial stone molding technique using rubber shell mold, in a box filled with rigid foam and fairly dry cement mix, with high mineral content.

WO 86/03433 teaches simulated stone or wood covering for floors or walls made by successive application of vinyl acetate emulsion, sand and cement mortar containing modified acrylic resin, etc.

DE 3813851 describes a method of producing concrete panel with decorative surface by first placing layer of colored particles in panel mold.

U.S. Pat. No. 1,681,727 shows a process of casting artificial stone to produce a revealed, textured surface which consists in preparing a sand mold, toughening a surface thereof corresponding to a revealed face of the piece to be cast by applying thereto irregularly arranged granular particles to produce a mold surface presenting irregularly arranged elevations, fluid treating the mold surface by spattering or spraying thereon masses of paraffin commingled with an oily fluid, and introducing into the mold a wet, stone-producing compound containing hydraulic cement.

U.S. Pat. No. 2,047,426 teaches a composition for coloring porous cementitious material comprising a dye dissolved in alcohol and mixed with an aromatic hydrocarbon and bituminous dispersing material.

U.S. Pat. No. 2,819,495 describes a method of forming an L-shaped building block having on its outer sides a simulation of a plurality of masonry elements held together by mortar comprising forming a molding block having a pair of legs disposed in perpendicular relation, each leg being provided with a surface corresponding to that of the masonry elements to be simulated and extending ridges corresponding to the masonry elements to be simulated on the horizontal leg and up to the level of the ridges; placing additional mortar on the mortar first applied and on the ridges of the horizontal leg, the additional mortar having a color corresponding to that of the groove mortar normally showing in the grooves between such masonry elements; placing a cover block with one leg elevated and the other leg horizontal; placing mortar of a color corresponding to the masonry elements to be simulated on the other leg and up to the level of the ridges; placing additional mortar on the mortar last applied and on the ridges of the other leg, the additional mortar having a color corresponding to that of the groove mortar normally showing in the grooves between such masonry elements; removing the cover, placing a zig-zag plate, having a configuration corresponding to the ends and the surfaces of the mortar opposite the legs, against the mortar; supporting the mortar by the plate, removing the molding block; and, curing the mortar while supported by the zig-zag plate.

U.S. Pat. No. 3,426,122 shows a process for molding cement products which are used to make retaining walls. The molded product is made within a mold cavity having a resilient mold piece at the bottom of the mold cavity and which is held at the opposite ends thereof only, so that the mold piece will flex upwardly thereby providing gradual release between the mold piece and the molded article. The molded piece can be removed while still green and without producing breakage of the article during such removal.

Additional examples of the prior art are found in U.S. Pat. No. 2,955,324; U.S. Pat. No. 3,839,514 and U.S. Pat. No. 3,848,043.

SUMMARY OF THE INVENTION

The present invention relates to a method for producing a wall, roadway, sidewalk or floor of cementitious material having the appearance of natural stone and mortar. As described more fully hereinafter, the method produces a base with an outer surface including a plurality of irregular shaped protrusions disposed in a random pattern to simulate natural stones and a plurality of simulated grout lines formed therebetween.

The method for producing the wall, roadway, sidewalk or floor comprises the steps of preparing a cementitious material, applying a hydrophobic release agent to the interior surface of a form, pouring the cementitious material into the form, vibrating the cementitious material, allowing the cementitious material to cure to form the base with the outer surface including a plurality of irregular shaped protrusions disposed in a random pattern to simulate natural stones and a plurality of simulated grout lines formed therebetween, releasing the base including the outer surface and plurality of simulated grout lines from the form, applying an acid stain to the outer surface, allowing the acid stain to etch the outer surface to shade or variegate the outer surface, washing the shaded or variegated outer surface with an acid, accenting the plurality of simulated grout lines with a pigment and sealing the outer surface with an acrylic polymer sealer.

To produce the cementitious material commercial grade sand, Portland cement, small aggregate, surfactant or wetting agent, water, and non-chloride accelerator are introduced into a mixer and thoroughly mixed to produce a homogeneous cementitious material.

A dry granular hydrophobic release agent is applied to the interior of a forming mold to prevent the cementitious material from adhering to the form. The homogeneous cementitious material is then poured into the form.

The cementitious material is vibrated causing the fines or smaller sand and aggregate particles to migrate to the bottom. The cementitious material is then cured and removed from the form.

An acid stain is applied to the outer surface of the base and allowed to set to shade the outer surface. The stained or shaded outer surface is then washed with an acid by the use of a nozzle or other suitable means.

The simulated grout lines are accented with an antiquing or iron oxide pigment with a brush or other suitable means.

Finally, the shaded and stratified layered outer surface and simulated grout lines are coated with a sealer with a brush or roller to protect the outer surface.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

The present invention relates to a method for producing a wall, roadway, sidewalk or floor of cementitious material having the appearance of natural stone and mortar including a base with an outer surface including a plurality of irregular shaped protrusions disposed in a random pattern to simulate natural stones and a plurality of simulated grout lines formed therebetween as described more fully hereinafter.

Figure 1:
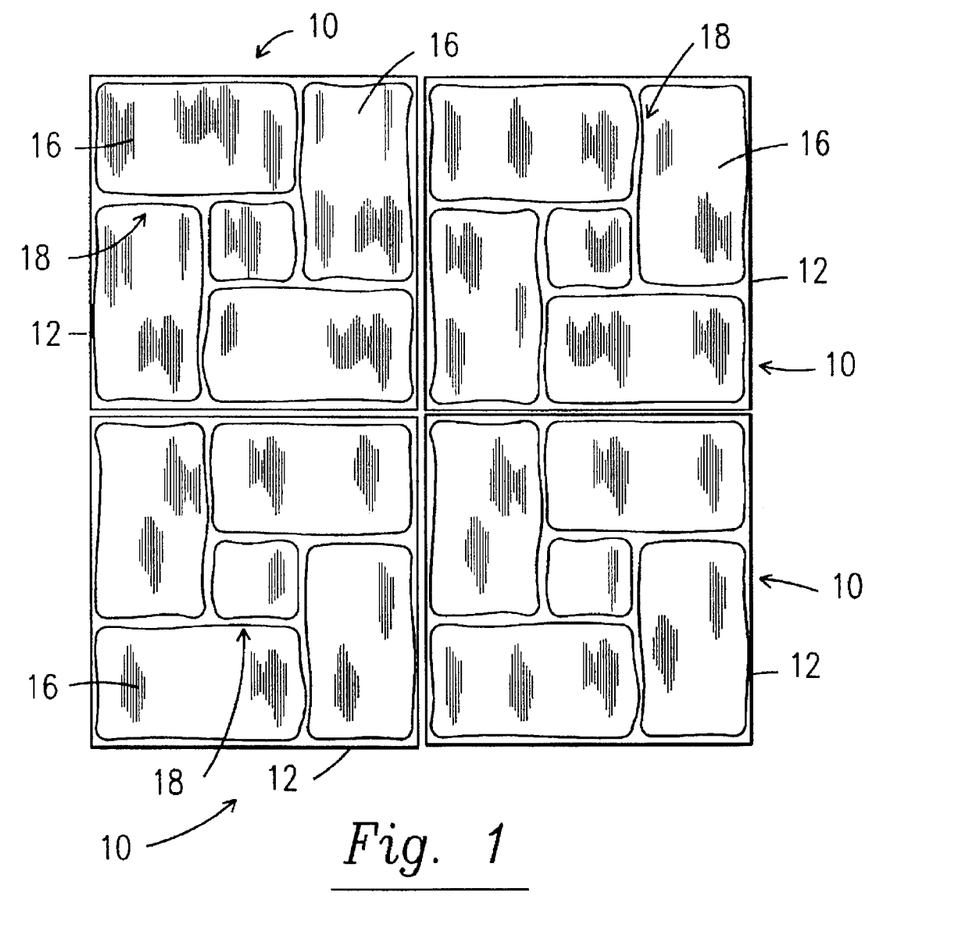
FIG. 1 is a top partial view of a roadway, sidewalk or floor consisting of a plurality of blocks or panels having the appearance of natural stone and mortar produced with the method of the present invention.
Figure 2:
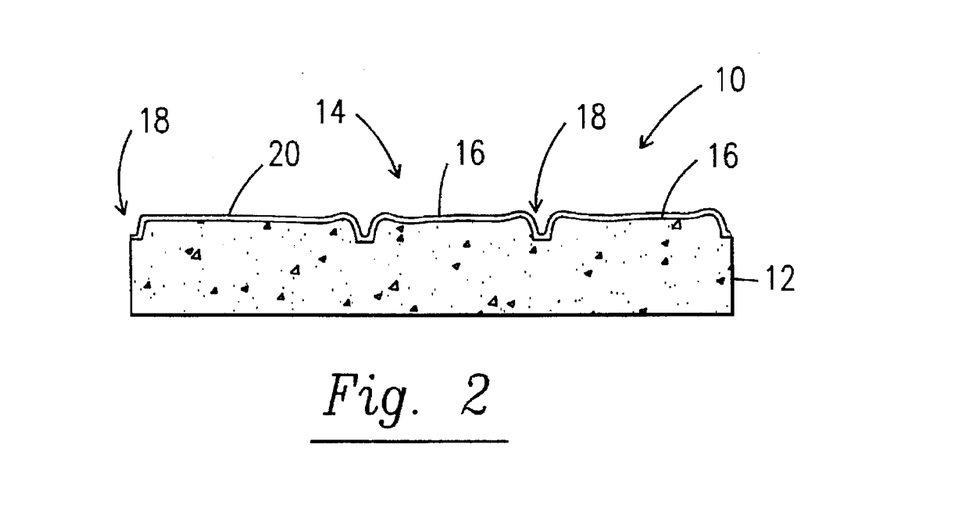
FIG. 2 is a cross-sectional side view of one of the blocks or panels shown in FIG. 1.

FIGS. 1 and 2 show individual blocks or panels each generally indicated as 10 combined to form a roadway, sidewalk or floor. Each block or panel 10 comprises a base 12 of cementitious material including a shaded and stratified layered outer surface generally indicated as 14 having individual stone elements or protrusions each indicated as 16 and the plurality of simulated grout lines each indicated as 18 formed therein. The shaded and stratified layered outer surface 14 and the simulated grout lines 18 are sealed with a clear acrylic thermal plastic water resistant sealer 20 to protect the shaded and stratified layered outer surface 14 from the environment.

Figure 3:
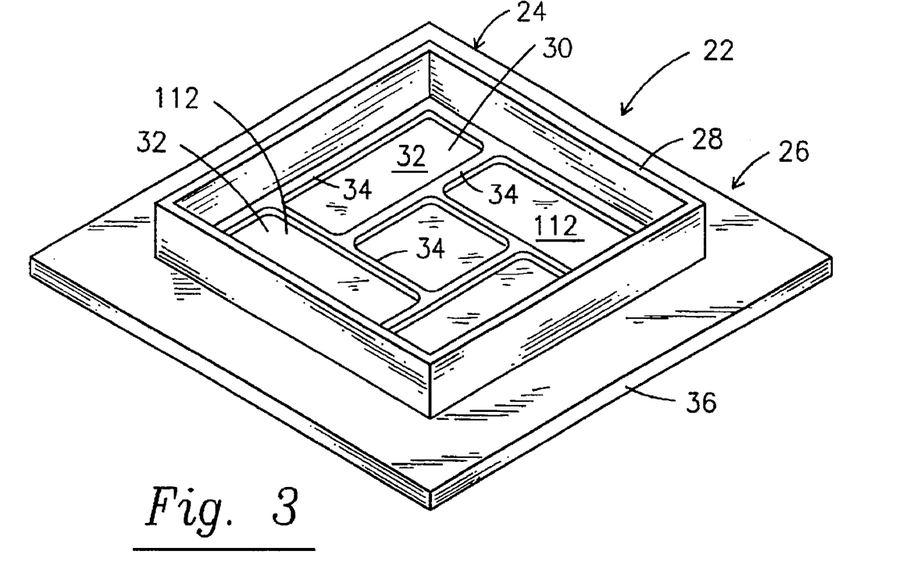
FIG. 3 shows a perspective view of the obverse mold used to produce the blocks or panels shown in FIGS. 1 and 2.

FIG. 3 shows a form generally indicated as 22 comprising a flexible obverse mold generally indicated as 24 used to form the individual blocks or panels 10 as described more fully hereinafter and a form member generally indicated as 26. The flexible obverse mold 24 comprises an outer peripheral wall 28 and contoured or irregular bottom 30 having a plurality of recesses each indicated as 32 formed therein corresponding to the individual stone elements or protrusions 16 and a plurality of raised grout line forming edges each indicated as 34 extending outwardly therefrom corresponding to the simulated grout lines 18. In production, the flexible obverse mold 24 is supported by the form member 26 such as a substantially rigid mold support member 36.

Figure 4:
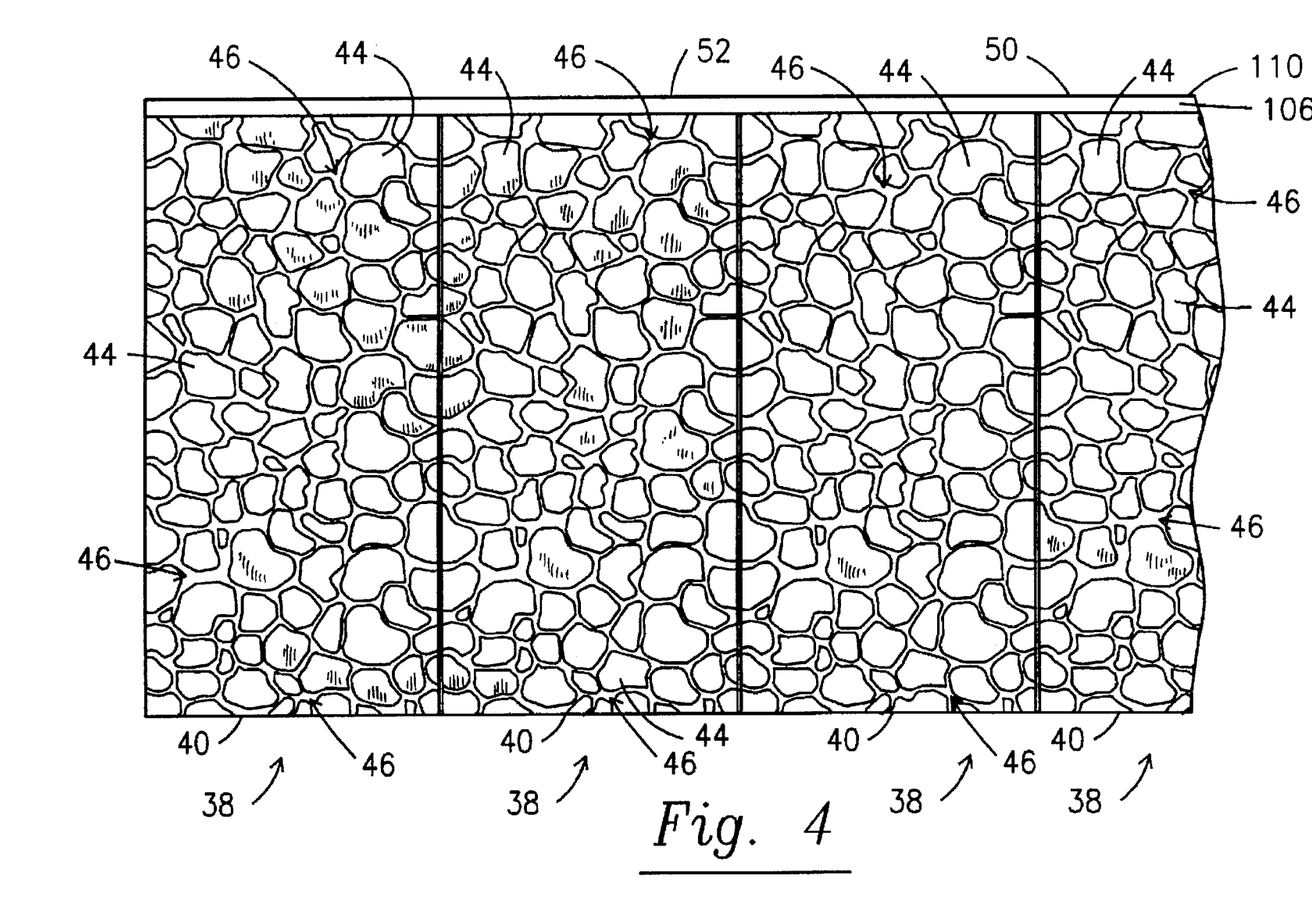
FIG. 4 is a front view of a wall consisting of a plurality of blocks or panels having the appearance of natural stone and mortar produced with the method of the present invention.
Figure 5:
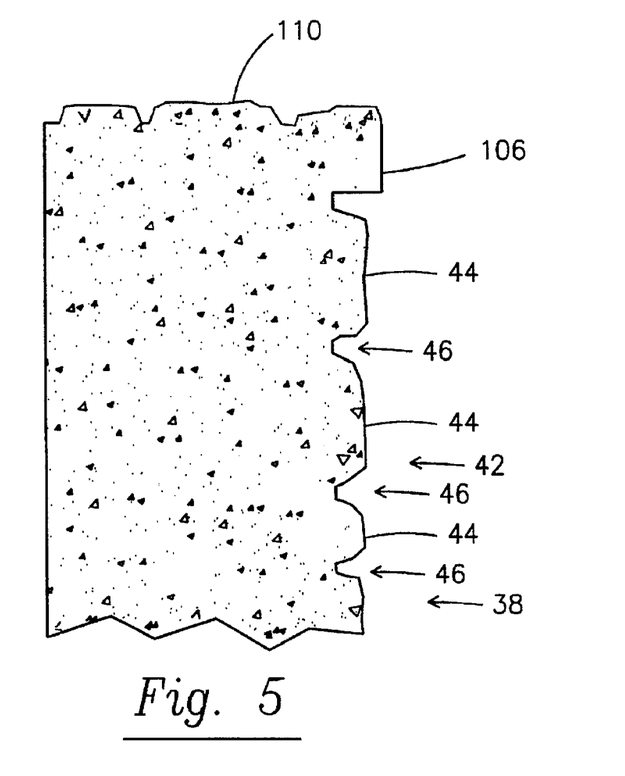
FIG. 5 is a cross-sectional side view of the wall shown in FIG. 4.

FIGS. 4 and 5 show individual blocks or panels each generally indicated as 38 combined to form a wall. Each block or panel 38 comprises a base 40 of cementitious material including a shaded and stratified layered outer surface generally indicated as 42 having individual stone elements or protrusions each indicated as 44 and the plurality of simulated grout lines each indicated as 46 formed therein. The shaded and stratified layered outer surface 42 and the simulated grout lines 46 are sealed with a clear acrylic thermal plastic water resistant sealer 48 to protect the shaded and stratified layered outer surface 42 from the environment. A cantilevered cap 50 extending the length of the wall comprises an overhang or ledge 52 extending outwardly past the shaded and stratified layered outer surface 42.

Figure 6:
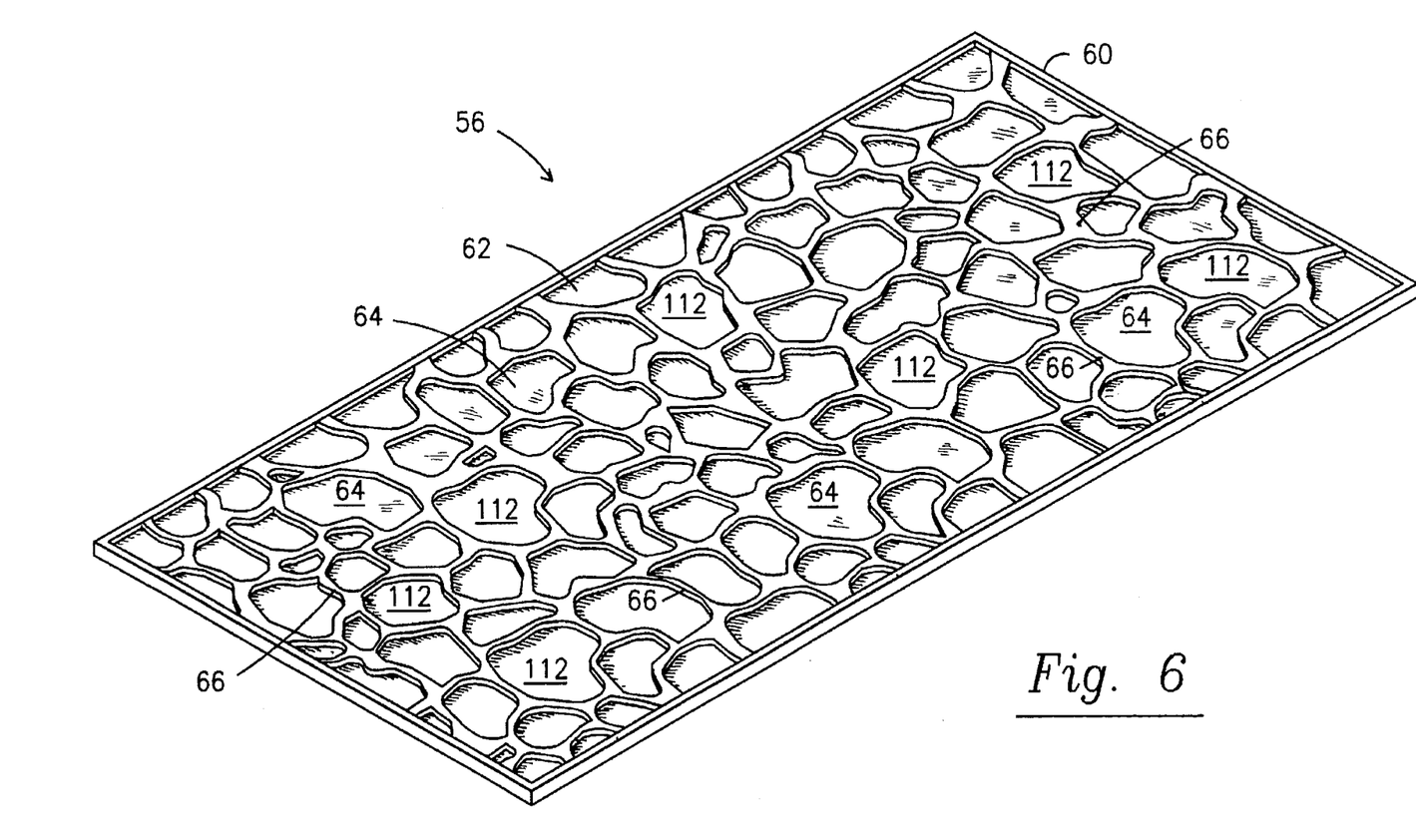
FIG. 6 is a perspective view of the obverse mold used to produce the blocks or panels shown in FIGS. 4 and 5.
Figure 7:
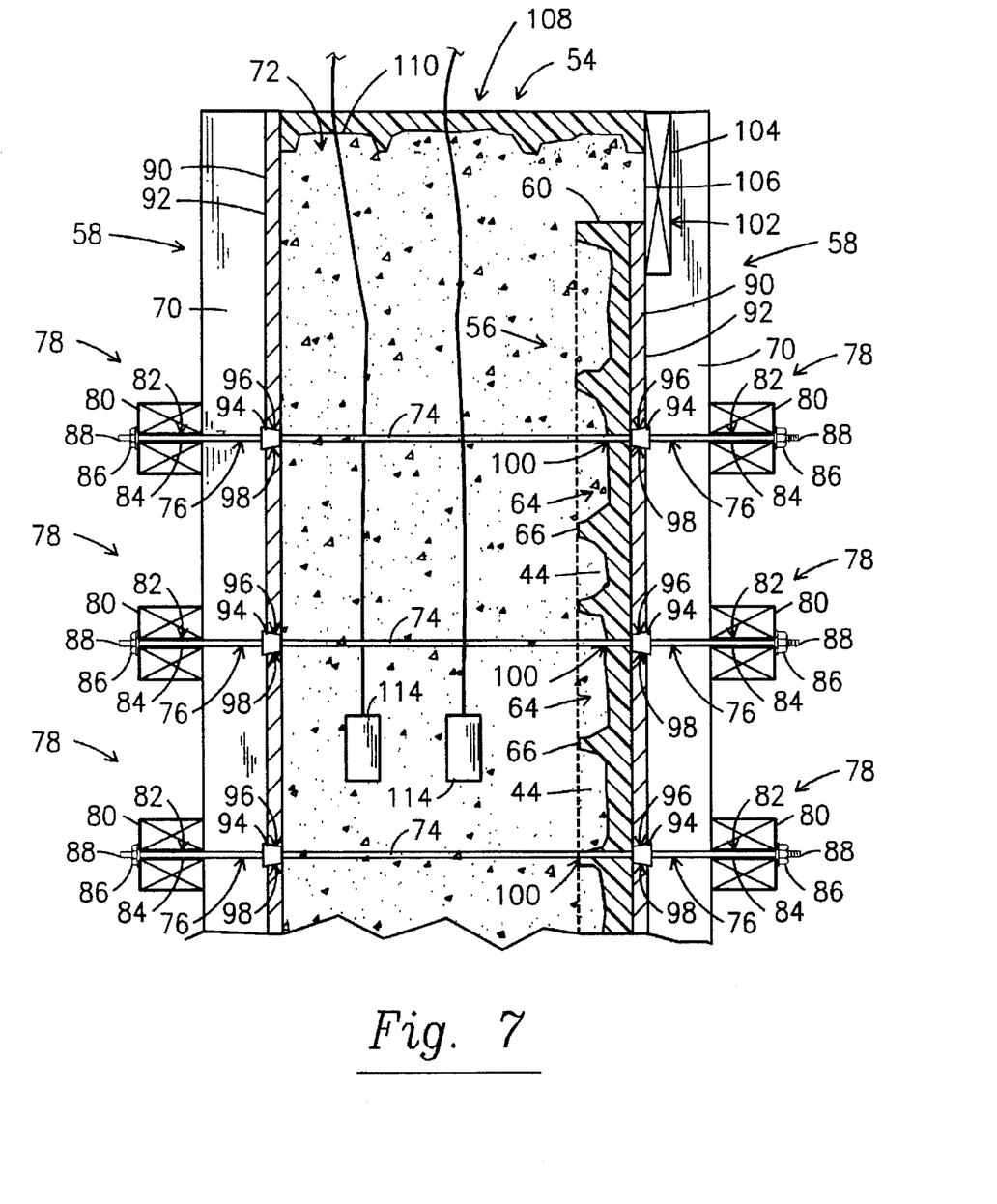
FIG. 7 is a cross-sectional side view of the form used to produce the blocks or panels shown in FIGS. 4 and 5.

FIGS. 6 and 7 show a form generally indicated as 54 comprising a flexible obverse mold generally indicated as 56 used to form the individual blocks or panels 38 as described more fully hereinafter and at least one form member generally indicated as 58. The flexible obverse mold 56 comprises an outer peripheral wall 60 and contoured or irregular bottom 62 having a plurality of recesses each indicated as 64 formed therein corresponding to the individual stone elements or protrusions 44 and a plurality of raised grout line forming edges each indicated as 66 extending outwardly therefrom corresponding to the simulated grout lines 46.

As best shown in FIG. 7, the form 54 further includes a pair of substantially vertically disposed outer form members each indicated as 70 held in substantially parallel relationship relative to each other by an interconnecting means to form a void or space 72 therebetween to receive the cementitious material as described more fully hereinafter. The interconnecting means comprises a plurality of substantially horizontally disposed interconnecting rods each indicated as 74 extending through the void or space 72 and corresponding rod apertures 76 formed through each of the pair of substantially vertically disposed outer form members 70 with a coupling means generally indicated as 78 attached to opposite ends of each of the plurality of substantially horizontally disposed interconnecting rods 74. Each coupling means 78 comprises a block 80 having a rod channel 82 to receive the opposite ends 84 of plurality of substantially horizontally disposed interconnecting rods 74 therethrough and affixed thereto by a fastening means such as a nut 86 mounted on external threads 88 formed on the ends 84 of the plurality of interconnecting rods 74.

An inner liner 90 disposed adjacent and in contact with the flexible obverse mold 56 is held in engagement with the inner face 92 of one of the outer form members 70 by a plurality of liner plugs each indicated as 94 disposed within corresponding liner apertures each indicated as 96 formed through the inner liner 90 having a plug channel 98 formed therethrough to receive one of the plurality of interconnecting rods 74. A second inner liner 90 is held in engagement with the inner face 92 of the other outer form member 70 by a plurality of liner plugs each indicated as 94 disposed within corresponding liner apertures each indicated as 96 formed through the second inner liner 90 having a plug channel 98 formed therethrough to receive one of the plurality of interconnecting rods 74. A plurality of mold apertures 100 are formed through the flexible obverse mold 56 disposed in axial alignment with the liner aperture 96 to receive one of the plurality of interconnecting rods 74.

A notch 102 is formed in the inner face 90 of the outer form member 70 supporting the flexible obverse mold 56 to receive a face plate 104 to form the face 106 of the overhang or ledge 52. Moreover, a secondary flexible obverse mold generally indicated as 108 similarly configured to the flexible obverse mold 56 may be placed on the poured cementitious material in the void or space 72 to form the appearance of natural stone and mortar on the upper surface 110 of the cantilevered cap 50.

The recesses 32/64 of either mold 22/56 may include different indicia such as letters or numbers indicated as 112 corresponding to the color or shade to be applied to the bottom 30/62 with the recesses 32/64.

The method employing a form including at least one obverse mold with an irregular bottom having a plurality of recesses formed therein corresponding to the irregular shaped protrusions and a plurality of raised grout line forming edges extending outwardly therefrom corresponding to the simulated grout lines comprises the steps of:

1. erecting or positioning the form including the obverse mold to receive the cementitious material;

2. preparing the cementitious material;

3. mixing an iron oxide pigment into the cementitious material;

4. coating the interior of the recesses with a tacky or jell-like material such as a fatty acid soap;

5. applying a hydrophobic release agent including a pigment to the plurality of recesses;

6. pouring the cementitious material into the form;

7. vibrating the cementitious material;

8. allowing the cementitious material to cure to form the wall, roadway, sidewalk or floor of cementitious material having the appearance of natural stone and mortar including the base with the outer surface with the plurality of irregular shaped protrusions disposed in a random pattern to simulate natural stones and the plurality of simulated grout lines formed therebetween;

9. separating the form from the cured cementitious material;

10. applying a pigment to the plurality of irregular shaped protrusions to create a tertiary random color pattern on the plurality of irregular shaped protrusions;

11. accenting the simulated grout lines with an antiquing or iron oxide pigment; and 12. sealing the surface having the appearance of natural stone or rock with a sealer.

The tertiary random color pattern may be created by applying an acid stain comprising an acid and pigment to the outer surface of the base and allowing the pigment to migrate into the outer surface of the base permitting the pigment to diffuse into the outer surface to create a tertiary random irregular variegated pattern therein.

Alternately, an iron oxide pigment may be randomly applied to the plurality of irregular shaped protrusions. To produce a yard of the cementitious mortar or material; 1,150 pounds of commercial grade sand, 640 pounds of Portland cement, 1,600 pounds of ⅜ inch to ½ inch small aggregate, 45 ounces of surfactant or wetting agent, 36 gallons of water, and 20 ounces to 60 ounces of non-chloride accelerator per hundred weight of Portland cement are introduced into a mixer and thoroughly mixed to produce a homogeneous cementitious mortar or material.

As described in detail in co-pending application Ser. No. 08/231,028 filed Apr. 22, 1994, now U.S. Pat. No. 5,372,676, a dry granular hydrophobic release agent is applied to the interior of the flexible obverse mold 56 to prevent the cementitious material from adhering thereto. The dry granular hydrophobic release agent may include an iron oxide pigment.

The cementitious material is vibrated by vibrating devices such as pencil vibrators 114 for at least 15 seconds causing the fines or smaller sand and aggregate particles to migrate to the contoured or irregular bottom 30/62. The cementitious material is then cured for approximately 24 hours forming the base 12/40 including the outer surface 14/42 with the individual stone elements 16/44 and a plurality of simulated grout lines 18/46 formed therein. The base 12/40 including the outer surface 14/42 with the individual stone elements 16/44 and a plurality of simulated grout lines 18/46 formed therein is then removed from the flexible obverse mold 24/56.

The acid stain of muriatic acid and iron oxide pigment may be applied to the outer surface 14/42 of the base 12/40 with a brush or other suitable means and allowed to set for 24 hours to shade the individual stone elements 16/44. In allowing the acid stain to etch into the upper decorative surface the pigment is allowed to diffuse or migrate into the upper decorative surface to create a secondary random irregular varigated pattern or random shaded areas therein.

The outer surface 14/42 is then washed with acid by the use of a nozzle or other suitable means.

The simulated grout lines 18/46 are accented with an antiquing or iron oxide pigment with a brush or other suitable means.

When constructing the wall shown in FIG. 4, the form 54 shown in FIG. 7 is only partially filled with the cementitious material and vibrated. The process of partially filling the form 54 is repeated several times until the form 54 is filled and capped with the secondary flexible obverse mold 108.

Finally, the shaded and stratified layered outer surface 14/42 and the simulated grout lines 18/46 may be coated with the clear acrylic thermal plastic water resistant sealer with a brush or roller to protect the outer surface 14/42 from wear.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A method for producing a wall, roadway, sidewalk or floor of at least one panel of cementitious material having an appearance of natural stone and mortar including a base with an outer surface with a plurality of irregularly shaped protrusions disposed in a random pattern to simulate natural stones and a plurality of simulated grout lines formed therebetween comprising the following steps:

(a) preparing a cementitious material;

(b) pouring the cementitious material into a form including an obverse block forming mold with a contoured or irregular bottom having a plurality of recesses formed therein corresponding to individual stone elements or protrusions and a plurality of raised grout line forming edges extending upwardly therefrom corresponding to the simulated grout lines;

(c) vibrating the cementitious material causing finer or smaller sand and aggregate particles to migrate to the contoured or irregular bottom to form a relatively nonporous upper decorative surface;

(d) allowing the cementitious material to cure forming the panel of cementitious material;

(e) releasing the panel of cementitious material from the obverse block forming mold;

(f) applying an acid stain comprising an acid and pigment to the upper decorative surface of the panel of cementitious material;

(g) allowing the acid stain to etch into the upper decorative surface causing the pigment to diffuse into the upper decorative surface to create a secondary random irregular variegated pattern therein.

2. The method of claim 1 further including;

(h) applying a hydrophobic release agent including a pigment to an interior of the obverse block forming mold having the plurality of recesses therein to form the corresponding plurality of individual stone elements before pouring the cementitious material into the obverse block forming mold to stain the cementitious material.

3. The method of claim 1 further including the following step:

(i) sealing the upper decorative surface with a sealer.

4. The method of claim 1 further including the following step:

(j) washing the upper decorative surface with an acid after etching.

5. The method of claim 4 wherein the obverse block forming mold includes the plurality of raised grout lines forming edges to form the plurality of simulated grout lines between the individual stone elements and the method further comprises the following step:

(k) accenting the plurality of simulated grout lines with a pigment.

6. A method for producing a wall, roadway, sidewalk or floor of at least one panel of cementitious material having an appearance of natural stone or rock and mortar including a base with an outer surface with a plurality of irregularly shaped protrusions disposed in a random pattern to simulate natural stones and a plurality of simulated grout lines formed therebetween comprising the following steps:

(a) erecting a form including a mold with a surface obverse to the outer surface of the panel having the appearance of natural stone or rock to be formed;

(b) preparing a cementitious material;

(c) pouring the cementitious material into the form;

(d) vibrating the form and the cementitious material;

(e) allowing the cementitious material to cure to form the contoured wall of cementitious material with the surface having the appearance of natural stone or rock;

(f) removing the form from the cured material;

(g) applying an acid stain comprising an acid and pigment to the outer surface of the panel having the appearance of natural stone or rock; and, (h) allowing the acid stain to etch into the outer surface of the panel having the appearance of natural stone or rock, causing the pigment to diffuse into the outer surface of the panel having the appearance of natural stone or rock, to create a secondary random irregular variegated pattern therein.

7. The method of claim 6 further comprising the following step:

(i) applying a hydrophobic release agent including a pigment to an interior of the mold having a plurality of recesses to form a corresponding plurality of individual replicated natural stones or rocks before pouring the cementitious material into the mold to stain the cementitious material.

8. The method of claim 6 further comprising the following step: (j) sealing the outer surface of the panel having the appearance of natural stone or rock with a sealer.

9. A method for producing a wall, roadway, sidewalk or floor of at least one panel of cementitious material having an appearance of natural stone and mortar including a base comprising an outer surface with a plurality of irregularly shaped protrusions disposed in a random pattern to simulate natural stones and a plurality of simulated grout lines formed therebetween comprising the following steps:

(a) erecting or positioning a form including an obverse mold to receive the cementitious material;

(b) preparing the cementitious material;

(c) pouring the cementitious material into the form;

(d) vibrating the cementitious material;

(e) allowing the cementitious material to cure to form the wall, roadway, sidewalk or floor of at least one panel of the cementitious material having the appearance of natural stone and mortar including the base with the outer surface comprising the plurality of irregularly shaped protrusions disposed in a random pattern to simulate natural stones and the plurality of simulated grout lines formed therebetween;

(f) separating the form from the cured cementitious material;

(g) applying an acid stain including an acid and pigment to the outer surface of the base and allowing the pigment to migrate into the outer surface of the base permitting the pigment to diffuse into the outer surface to create a tertiary random irregular variegated pattern therein; and (h) sealing the outer surface having the appearance of natural stone and mortar with a sealer.

10. The method of claim 9 further comprising the following step:

(i) mixing an iron oxide pigment into the cementitious material before pouring.

11. The method of claim 9 further comprising the following step;

(l) accenting the simulated grout lines with an antiquing or iron oxide pigment.

12. The method of claim 9 wherein step (g) comprises the application of iron oxide pigment randomly to the outer surface.

13. The method of claim 9 further comprising the following steps:

(j) coating the interior of the obverse mold with a fatty acid material, the interior of the obverse mold having a plurality of recesses to form the corresponding irregularly shaped protrusions disposed in a random pattern to simulate the natural stones before pouring the cementitious material into the form and (k) applying a hydrophobic release agent including a pigment to the fatty acid material before pouring the cementitious material into the form.

14. The method of claim 13 wherein the recesses of the obverse mold include different indicia corresponding to different colors or shades to be applied to the respective recesses.

15. The method of claim 9 wherein a wall is constructed by first partially filling the form with the cementitious material and vibrating, and then repeating the filling and vibrating several times until the form is filled.

16. The method of claim 15 wherein the form is capped with a secondary obverse mold.

* * * * *